Patented Jan. 7, 1930

1,742,411

UNITED STATES PATENT OFFICE

JOSEF MÜLLER, OF WEISSENSTEIN-ON-THE-DRAU, KARNTEN, AUSTRIA, ASSIGNOR TO THE FIRM SCHUMACHER'SCHE FABRIK G. M. B. H., OF STUTTGART, GERMANY

POROUS MOLDED BODY TO BE USED IN DIFFUSION, FILTRATION, ETC., AND PROCESS FOR MAKING THE SAME

No Drawing. Application filed July 8, 1926, Serial No. 121,273, and in Austria July 10, 1925.

My invention relates to the manufacture of unburnt porous molded bodies to be used for separating solid substances from liquids or gases (filters) or for obstructing the diffusion between different solutions, as for instance the anode- and cathode liquid in electrolysis (diaphragms).

The porous body consists of granular or fibrous material, neutral in regard of its destinated use, the particles of which are cemented together to a homogeneous solid mass by means of a binding agent, which is plastic when in a hot state. For producing the porous body the said filling materials, which for themselves—as a whole—do not offer any resistance to mechanical strain, such as for instance quartz shivers, quartz sand, glass shivers, glass-sand, glass-wool, wool of asbestos and the like, are, in a heated state, intimately mixed with some cementing agent, which in the hot state is plastic, such as asphalt, goudron, pitch, tar, resins or the like or mixtures thereof, and then the mass is pressed in molds at a temperature near the melting point of the employed binding agent. This method offers the advantage, that the size of the pores and their volume can systematically be controlled and adjusted to the finest graduation by the following measures: Choice of the suitable size of grains of the employed filling materials, in certain cases use of filling materials having different sizes of grains, variation of the proportions of the constituents, viz of the filling material and binding agent, and finally varying the intensity of the pressure applied in the molds. The pressure may vary from such as is created by pounding and employed for very coarse filters, up to about 200 kilogrammes per square centimeter. Particles of greater size and low pressure give a coarser product, that is to say, the pores are of larger size, whilst from smaller particles and high pressure a filter or diaphragm of very fine structure will result. By suitably varying and combining these conditions pieces of any desired internal structure may be made without unfavorably influencing the mechanical strength of the body. When currents are to pass the body, the filling materials and binding agents are in accordance with the kind of electrolysis to be chosen such, that they are not attacked by the electrolyte nor by the reaction products. So e. g. for acid electrolysis quartz, glass, glass-wool or the like are to be chosen as filling material and asphalt or tar for binding.

By practical experience I have now found, that the porous bodies manufactured in this manner after having been formed by hot pressing can subsequently be freed of part of the binding agent by heating them up again to a relatively low temperature without losing their form. On the contrary by this subsequent treatment the strength and resistance to deformation of the molded bodies is even increased. Moreover these porous bodies possess after expulsion of the removable excess of binding agent a higher degree of resistance to changes of temperature and a higher porosity.

During the subsequent heating and during the cooling, which preferably is carried out slowly, the molded bodies have to be supported in an appropriate manner in order to avoid deformation.

According to the temperature employed and to the duration of this subsequent treatment within the molded bodies smaller or larger quantities of carbon are separated, which are mechanically bound therein. When filters to be used for hygienic purposes are made according to the invention, thereby means are given for systematically increasing the hygienic efficiency of the porous bodies.

The molded bodies made according to the present process are nonconductors of electricity.

*Example*

A porous plate, made from 200 grammes of sand (size of grains from 0.2 to 0.5 millimetres) and of 16 grammes of hard pitch by pressing the mixture under heat is placed on a support, the form of which is chosen in accordance with that of the plate, and is in an appropriate room subjected to a temperature of 300 to 400° C. as long as an expulsion of vapors can be observed. After the vapors will have disappeared, the plate is slowly cooled down and thereafter can be taken off from the support.

What I claim is:

1. The method of making porous bodies, comprising mixing finely subdivided refractory material with a bituminous binder, molding under pressure at a temperature approaching the melting point of said binder, allowing the molded body to cool down, reheating same to a temperature above 300° and not exceeding 400° C. and allowing same to cool slowly.

2. The method of making porous bodies, comprising mixing sand with hard pitch, molding under pressure at a temperature approaching the melting point of said binder, allowing the molded body to cool down, reheating same to a temperature above 300° and not exceeding 400° C. and allowing same to cool slowly.

In testimony whereof I have affixed my signature.

JOSEF MÜLLER.